May 15, 1945.  A. QUENTIN  2,375,944

METHOD OF TEMPERING GLASS ARTICLES

Filed Jan. 19, 1940  5 Sheets-Sheet 1

INVENTOR
ALBERTO QUENTIN
BY
ATTORNEY.

May 15, 1945.　　　A. QUENTIN　　　2,375,944

METHOD OF TEMPERING GLASS ARTICLES

Filed Jan. 19, 1940　　　5 Sheets-Sheet 2

INVENTOR
ALBERTO QUENTIN
BY
ATTORNEY.

May 15, 1945.  A. QUENTIN  2,375,944
METHOD OF TEMPERING GLASS ARTICLES
Filed Jan. 19, 1940   5 Sheets-Sheet 3
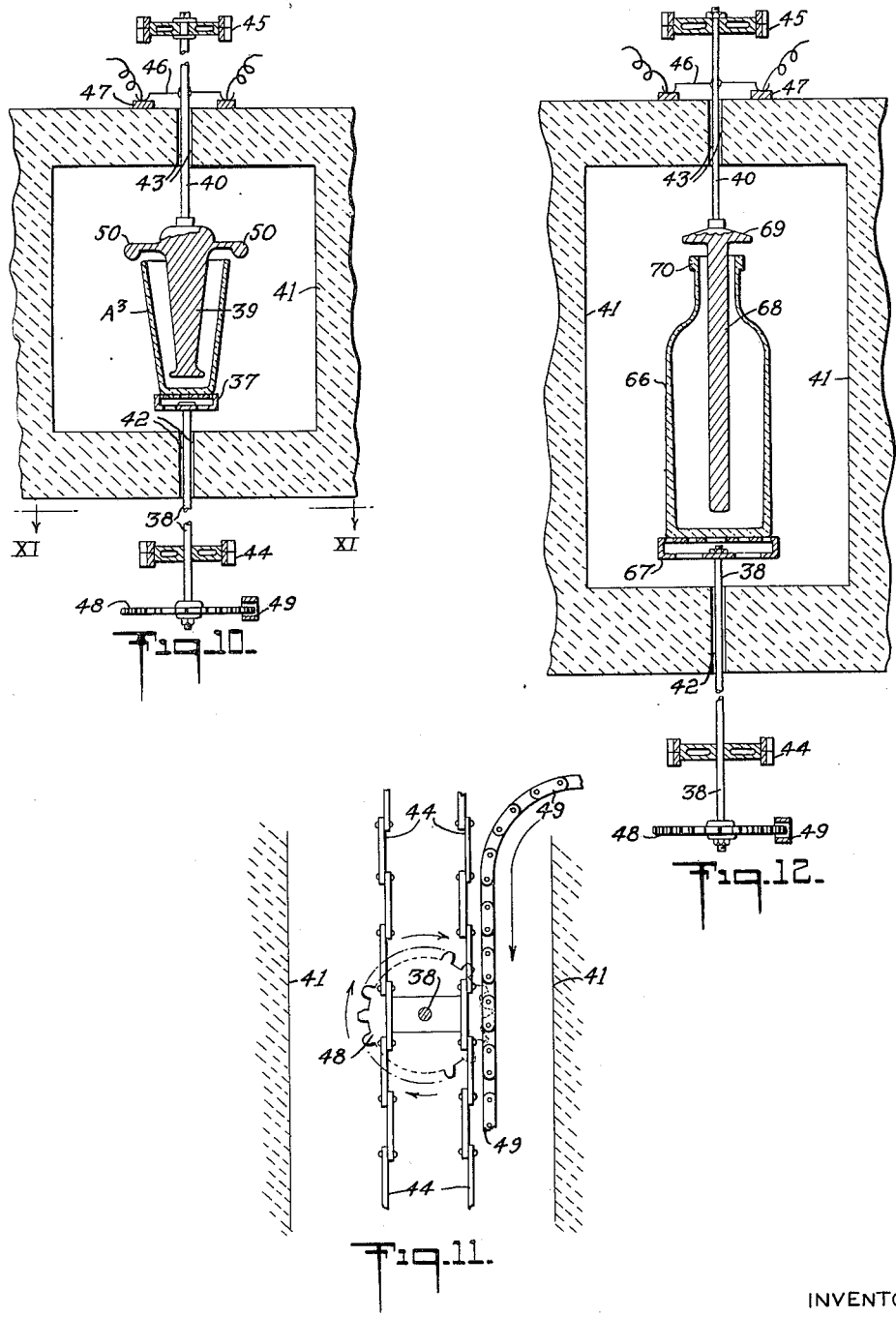
INVENTOR
ALBERTO QUENTIN
BY
ATTORNEY.

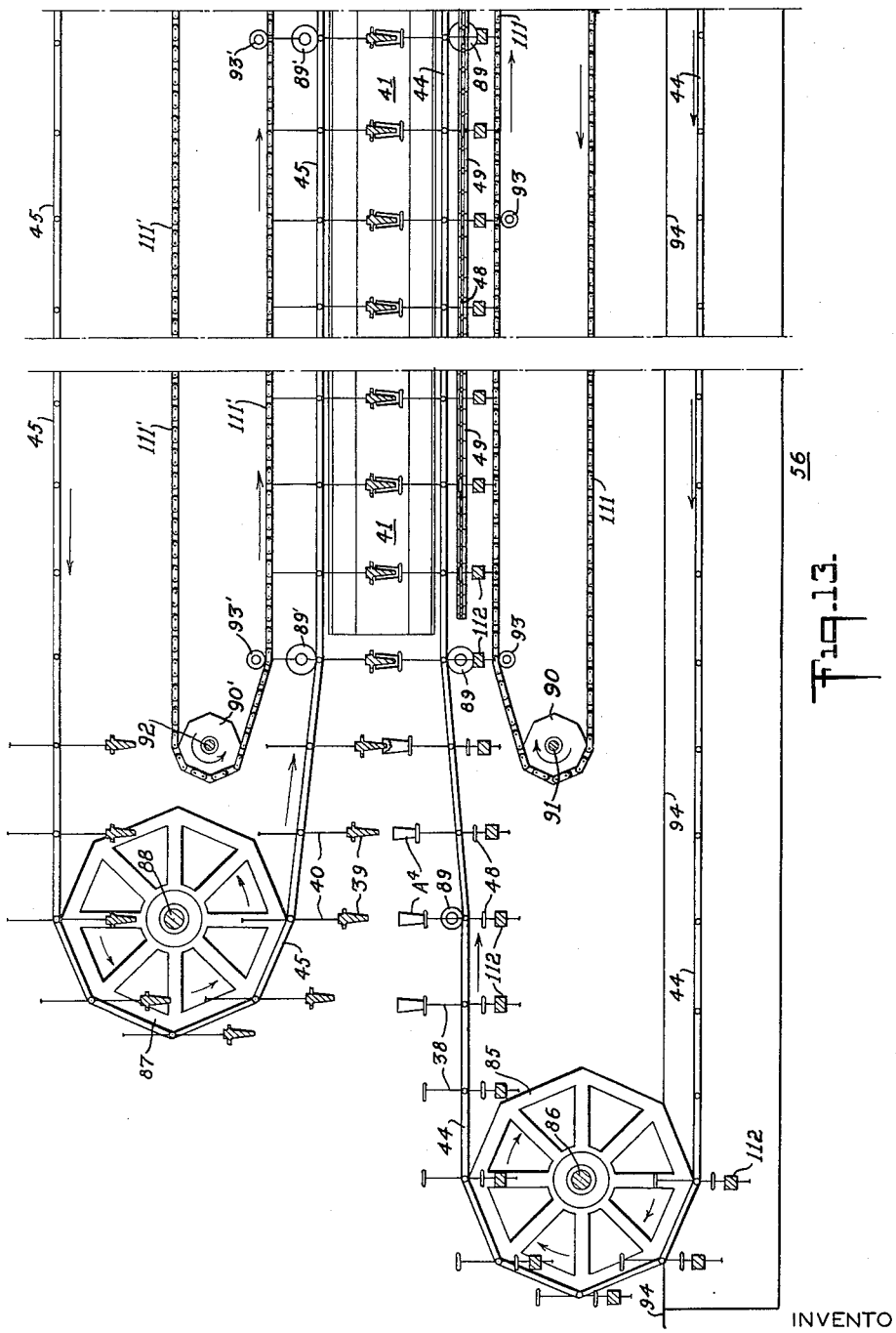

May 15, 1945. A. QUENTIN 2,375,944
METHOD OF TEMPERING GLASS ARTICLES
Filed Jan. 19, 1940 5 Sheets-Sheet 5
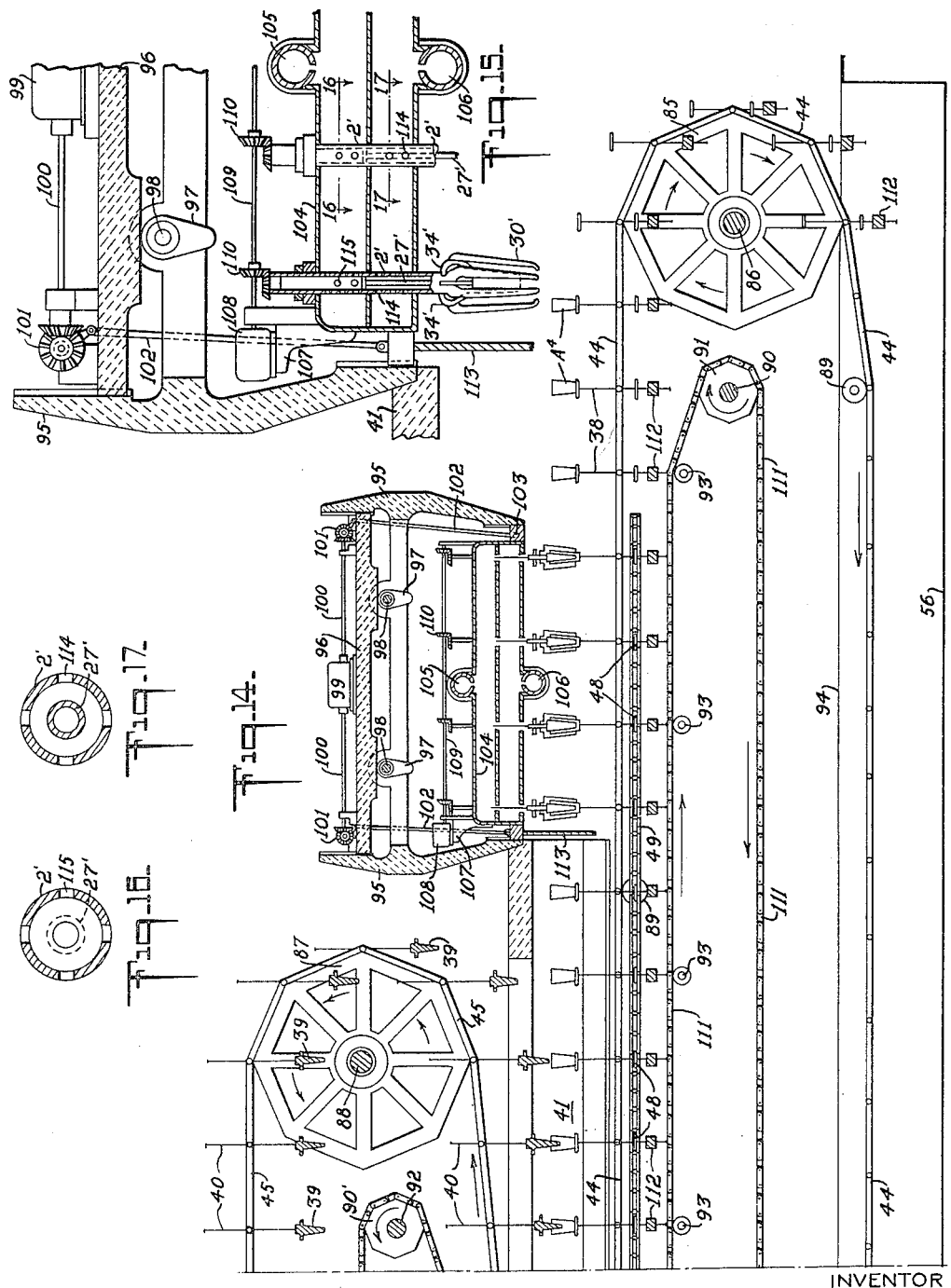
INVENTOR
ALBERTO QUENTIN
BY
ATTORNEY.

Patented May 15, 1945

2,375,944

UNITED STATES PATENT OFFICE 2,375,944

METHOD OF TEMPERING GLASS ARTICLES

Alberto Quentin, Milan, Italy; vested in the Alien Property Custodian

Application January 19, 1940, Serial No. 314,727
In Italy January 24, 1939

6 Claims. (Cl. 49—89)

This invention refers to the tempering of hollow glass articles by a sudden cooling of said articles or containers through the medium of blowing jets of air or other fluids against the surfaces of the same.

The invention refers generally to all kinds of hollow glass ware, such as drinking glasses, bottles, vases, tubes, globes, and other containers including bombs, such articles having walls of any thickness or of variable thicknesses.

However, the invention has particular advantage in the treatment of glass articles having relatively thin walls.

Previously it has been the practice to temper glass articles by immersion preferably in oil or molten salt baths immediately after being extracted from the forms and while they were still at relatively high temperatures. This treatment, however, diminishes the brilliancy of the glass, and with articles of varying thicknesses, such tempering by immersion results in uneven tempering prejudicial to the elasticity and resistance of the tempered articles.

These drawbacks are eliminated by the improvements in the tempering method herein disclosed, which embodies the following features:

(a) An article being tempered is slowly heated in a manner to bring all of its parts to a suitable tempering temperature, with walls of varying thicknesses being subjected to varying heats until uniformity of desired temperatures throughout the entire article is obtained;

(b) The heated article is subjected to jets of high pressure cooling fluid issuing through nozzles positioned close to the walls of the article; such jets (or the article or both) being moved to obtain rapid and substantially uniform distribution of the cooling fluid over the entire internal and external surfaces of the article;

(c) The inner surfaces of articles, such as drinking glasses, may be tempered more rapidly than their outer surfaces, so that the "core" formed between the suddenly cooled outer layers of the walls of the article will be displaced so that the outer surfaces of the articles, which are more frequently subjected to shocks, will be more resistant than their inner surfaces;

(d) Variations may readily be made in the arrangement of cooling fluid jets where the shape of the articles being tempered does not permit the nozzles to follow the shape of the articles; as, for example, when tempering bottles, only the inner nozzles may be moved, or may emit cooling fluid at a pressure different from that of the outer nozzles, to compensate for the variations in number of the jets or in distance of the nozzles from the walls of the articles;

(e) Articles having relatively thin walls, become tempered very rapidly, for instance, within 5 to 10 seconds, with high pressure jets of air or other fluid, at a pressure of from 7 to 8 atmospheres, issuing from nozzles placed at a little distance, e. g., 3 to 5 mm. from the walls of the articles.

These and other features will be apparent from the following description of examples of method and apparatus for carrying out the invention, shown in the annexed drawings, wherein Fig. 1 is a central vertical section through a drinking glass tempered in accordance with my invention, the "core" being shown displaced toward the interior of the glass.

Fig. 10 is a vertical section through a further modified form of tempering apparatus having an elongated heating chamber through which travels the drinking glasses being heated, Fig. 11 is a horizontal section taken substantially on the line XI—XI of Fig. 10, Fig. 12 is a view similar to Fig. 10 arranged to heat bottles rather than drinking glasses, Fig. 13 is a schematic side elevation of one extremity of a continuous heating and tempering apparatus according to the invention, Fig. 14 is a schematic side elevation of the other extremity of the apparatus of Fig. 13.

Fig. 15 is an enlarged vertical section of a portion of the tempering mechanism shown in Fig. 14, and Figs. 16 and 17 are detail horizontal sections taken on the lines 16—16 and 17—17 of Fig. 15.

Figure 1:
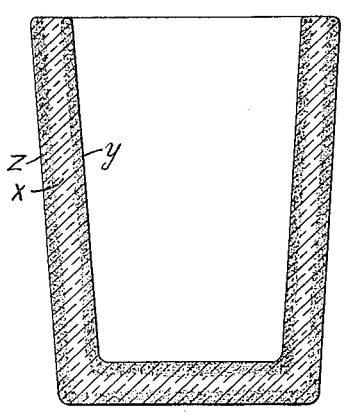

Referring now to the drawings, the drinking glass shown in Fig. 1 is formed with a "core" portion $x$ between the suddenly cooled inner and outer layers $y$ and $z$ respectively of the tempered drinking glass. This more slowly cooling interior portion or core $x$ is displaced relatively to the exterior surface, as by more rapidly tempering the inner layer $y$ of the glass while slowly tempering the outer layer $z$ more resistant to shocks. The "core" portion may be defined as that interior portion not contacted by the cooling fluid and located between the inner and outer layers $y$ and $z$ which are contacted by the cooling fluid.

Figure 2:
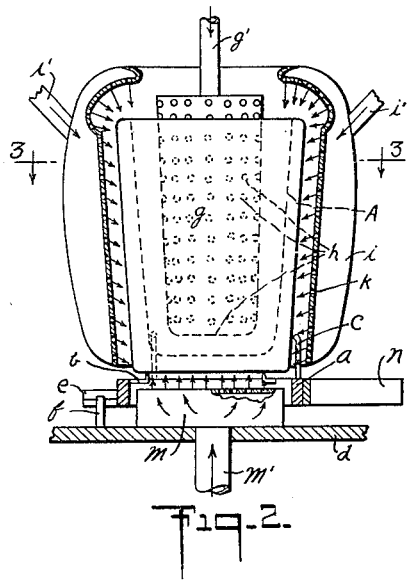
Fig. 2 is a vertical section through a tempering device of my invention with a drinking glass in position for tempering, both the inner and outer nozzles being shown as stationary.
Figure 3:
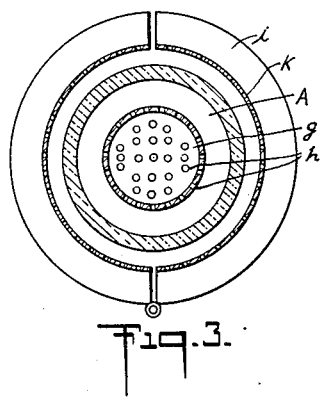
Fig. 3 is a horizontal section taken substantially on the line 3—3 of Fig. 2.
Figure 4:
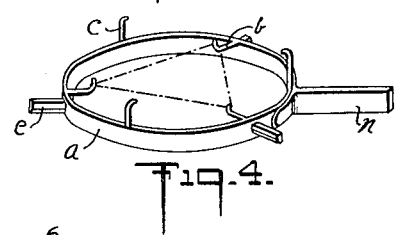
Fig. 4 is a perspective view of a supporting ring for the object being tempered in the device of Fig. 2.

The apparatus shown in Figs. 2-4 comprises stationary means for applying jets of cooling fluid to an article being tempered, such as the drinking glass A, which is positioned upon a supporting ring $a$ resting upon an apertured blower nozzle $m$ on the table $d$. Radial lugs $b$ and vertical lugs $c$ extend from the ring $a$ to position the drinking glass A centrally of the ring and slotted arms $e$ on the ring coact with upright pins $f$ on the table to position the ring $a$ with relation to the several blower elements. Radial lugs $b$, which serve to support the object to be tempered, may be connected by metallic wires, as indicated by the broken lines in Fig. 4, and a net of wires may be provided so as to impress decorative or inscribed indicia in the bottom of the object. Cooling fluid, as air, is directed against the inner face of the glass A through a plurality of apertures $h$ in the wall of the cylindrical blower element or nozzle $g$ receiving fluid under pressure through pipe $g'$. Cooling fluid is similarly directed against the outer face of the glass A through a plurality of apertures $k$ in the outer blower element $i$, herein shown as formed of a pair of hinged semi-cylindrical hollow shells $i$ arranged to enclose the glass being tempered, substantially as shown in Fig. 3. Cooling fluid under pressure is admitted to the shells $i$ through pipes $i'$; and may come from the same source that supplies fluid to pipe $g'$ or other sources. Cooling fluid is supplied to the blower element $m$ through pipe $m'$ and issues through suitable apertures against the bottom of glass A.

The form and arrangement of the three blowing elements, $g$, $i$ and $m$, are such that jets of cooling air, or other fluid, will be blown against the entire inner and outer surface of the article being tempered, the apertures in such blower elements being positioned as closely as desired for effective tempering. Obviously the flow of cooling fluid may proceed for different time intervals from the several blower elements.

The supporting ring $a$ is shown with a projecting handle $n$ which may serve in transporting glass A from the heating chamber to the tempering apparatus, though such transportation may be effected in various ways, manually or mechanically.

Figure 5:
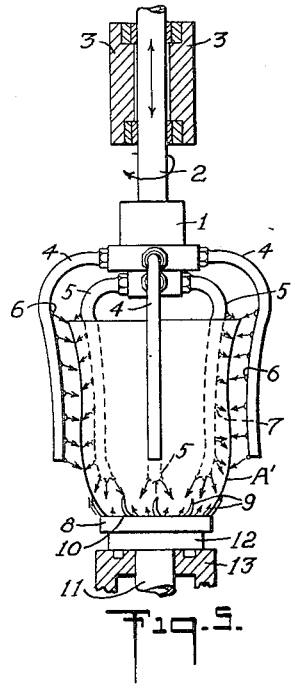
Fig. 5 is a vertical section through a modified form of tempering apparatus, wherein both the inner and outer nozzles are moved, either with a simple rotating movement or with combined rotary and axial up and down movements.
Figure 6:
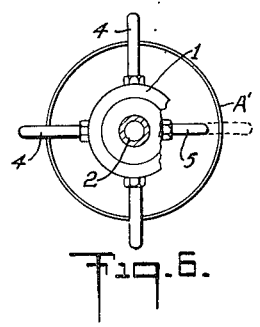
Fig. 6 is a plan view of the tempering apparatus of Fig. 5, with parts broken away.
Figure 7:
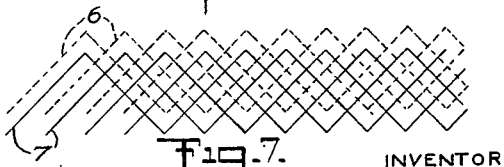
Fig. 7 is a diagrammatic view showing the paths described by the jets shown in Fig. 5 during said combined rotary and axial movements.

In Figs. 5 and 6 is shown a modified tempering apparatus wherein cooling fluid is blown upon the articles being tempered through moving jets, the motion of such jets being rotary, axially of the article, or a combination of both rotary and axial movements. A hollow head 1 projects from the lower end of the hollow shaft 2, which is mounted in special bearings 3 for rotary and longitudinal movements therein. Hollow nozzles 4 and 5 extend radially and then downwardly from the head 1, some of which, as 4, extend into proximity with the outer face of the article being tempered and may be shaped correspondingly, while the remaining nozzles, as 5, extend within the article to points adjacent its bottom and may also be shaped to correspond with the interior shape of the article being tempered. A plurality of apertures 6 and 7 are formed in the nozzles 4 and 5 respectively in positions to direct cooling fluid against the surfaces of the article. The article being tempered, as the drinking glass A', is supported upon a ring 8 provided with peripheral fingers 9 to center the article. The ring 8 rests upon a hollow blower element 12 formed with apertures 10 in its upper surface to direct cooling fluid against the bottom of glass A', such cooling fluid being conducted through the hollow shaft 11 mounted in suitable bearings 13. By means of appropriate mechanism (not shown) the shaft 2 may be rotated at will and also reciprocated to impart up and down motions to the nozzles 4 and 5, and, if desired, both rotary and reciprocating motions may be simultaneously imparted, whereby the nozzles 4 and 5 will describe paths substantially as shown diagrammatically in Fig. 7, where the paths of the nozzles 4 are shown in dotted lines. Obviously the articles being tempered may also be rotated at will by imparting rotation to shaft 11.

Figure 8:
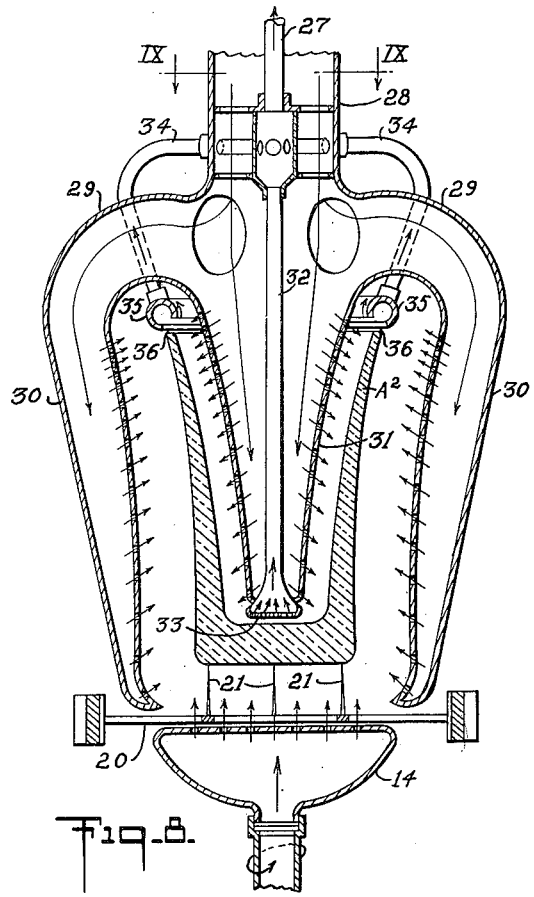
Fig. 8 is a vertical section through a second modified form of tempering apparatus taken substantially on the line VIII—VIII of Fig. 9.
Figure 9:
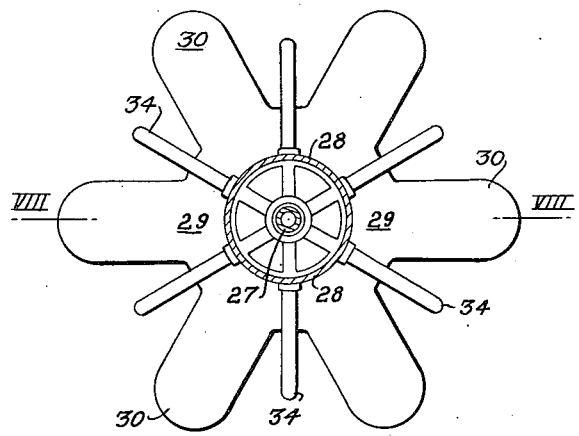
Fig. 9 is a horizontal sectional view taken substantially on the line IX—IX of Fig. 8.

In Figs. 8 and 9 is shown another modified form of tempering apparatus designed particularly for tempering articles having walls of varying thicknesses. The main blower element comprises a hollow head 28 from which depends a distributing body 29 carrying a plurality of circumferentially spaced hollow arms 30 provided with apertures for directing cooling fluid against the outer face of the article being tempered, and a hollow central frusto-conical nozzle 31 provided with peripheral apertures for directing cooling fluid against the inner wall of the article being tempered, herein shown as a drinking glass $A^2$ having a wall tapering in thickness from a heavy base. As indicated in Fig. 8, the apertures through which the cooling fluid issues are more widely spaced at and near the thicker base. The article is supported upon upright needles 21 of a fixed open frame 20, and a blower element 14 is provided with apertures in its upper face in position to direct cooling fluid against the bottom face of glass $A^2$.

In addition, the tempering apparatus of Figs. 8 and 9 is provided with means for quickly exhausting the cooling fluid from certain areas adjacent the glass $A^2$. A suction pipe 27 is arranged centrally of the head 28 and connects with a series of exhaust tubes, one of which, as 32, extends centrally within the glass $A^2$ and terminates in a flaring mouth 33 opening below the blower element 31 and close to the bottom of the glass. Closely adjacent the thin upper edge 36 of glass $A^2$ is arranged a suction ring 35 connected to suction pipe 27 by a plurality of circumferentially spaced tubes 34.

In Figs. 10 to 12 is shown another embodiment of the invention wherein one arrangement for heating the glass in preparation for tempering is disclosed as part of a completely automatic mechanism. The glass $A^3$ is supported upon a member 37 at the upper end of a vertical shaft 38 carried by a lower endless chain 44. At the lower end of each shaft 38, below the chain 44, is arranged a gear wheel 48 the teeth of which engage with a chain 49 so as to impart to the shafts 38 a slow rotating movement to insure uniform heating of the glass $A^3$. In the interior of each glass $A^3$ is arranged a heating element 39, preferably of the type heated by an electric resistance element. As herein shown, each heating element 39 is carried at the lower end of a vertical shaft 40 suspended from a cross member pivotally mounted in links of the upper endless chain 45. Suitable contacts 46 are mounted upon the shafts 40 and engage contact guides 47, which are suitably connected with the source of current. An elongated heating chamber 41 of refractory material is formed with slots 42 and 43 for the passage of the vertical shafts 38 and 40, respectively, as the upper and lower chains 44 and 45 progress.

The heating element 39 is shown with an upper circular portion 50 of greater diameter than the upper edge of glass $A^3$ to assist in heating the upper portion of the glass which is normally separated a greater distance from the heating element 39 than is the lower portion of the glass.

In Fig. 12 substantially the same heating chamber and associated elements are shown, with the heating element adapted for heating a bottle. The bottle 66 rests upon support 67 carried by one of the shafts 38 which receives its transporting movement from the lower chain 44 and a slow rotary movement from wheel 48, as above described. The heating element 68 is longer and thinner than the heating element 39 designed for heating the glass $A^3$, and is provided with a circular extension 69 of slightly greater diameter than top 70 of the bottle, and aids in heating the edge portion of the bottle top.

In Figs. 13 and 14 is shown, by way of example, an automatic mechanism for continuously heating and tempering glassware.

The lower chain 44 serves to transport the glass objects to be tempered, and is mounted upon spaced polygonal wheels 85 which rotate upon horizontal shafts 86. The length of each sector of wheels 85 corresponds to the length of each link element of chain 44, substantially as shown. The shafts 38 are pivoted upon cross members so as to maintain their vertical positions throughout the complete revolution of chains 44. An upper chain 45 is similarly arranged upon polygonal wheels 87, journalled on horizontal axles 88 and carries the heating elements 39 (or their equivalents) upon rods 40 similarly arranged to maintain their vertical positions throughout complete revolutions of chain 45. The elements of chains 44 and 45 have the same length. Chain 44 is guided by rollers 89, and similar guide rollers 89' are provided for chain 45.

Shorter chains 111 and 111' are arranged inside chains 44 and 45, passing over the spaced polygonal wheels 90 and 90' mounted on horizontal axles 91 and 92 respectively. The chains 111 and 111' must, of course, be synchronized with chains 44 and 45 and aid in maintaining the glass objects in substantially vertical positions during the heating and tempering operations. Chain 111 is guided by rollers 93 and similar guide rollers 93' are provided for chain 111'. The shafts 38 are also provided with weights 112 below the pivotal connection of the shafts with the chain 44 to aid in mounting the glass objects in substantially vertical positions throughout the entire flight of chain 44.

The glass objects $A^4$ are brought into position to receive the heating elements carried by the upper chain 45, which in its advance brings the elements 39 with the glass objects into one extremity of the heating chamber 41. They remain in contiguous positions while passing through the heating chamber, the exit of which is substantially closed by the flap 113. Upon emerging from the heating chamber 41, the glass objects are immediately subjected to the tempering fluid, as, for example, shown in Fig. 14. The disclosure illustrates a compact mechanism for transporting a plurality of glass objects through the heating chamber, and height may be kept at a desired minimum by arranging the path of the lower portion of chain 44 and associated elements within an elongated pit 56 below the floor 94 supporting the mechanism.

The tempering mechanism comprises a frame 95 of refractory material in which is slidably mounted a shelf 96, which is alternately moved up and down by eccentrics 97 mounted on shafts 98, the actuating mechanism of which is not shown. The shelf 96 carries an electric motor 99 arranged to rotate gears 101 mounted on horizontal shafts 100 and actuating vertical rods 102, which terminate in guides 103 on opposite sides of the box 104, whereby box 104 and parts carried thereby are vertically reciprocated independently of shelf 96 (Fig. 15). The box 104 is preferably divided into two portions, with the upper portion connected to an exhaust pipe 105 for creating a partial vacuum, and the lower portion connected to an inlet pipe 106 through which compressed air or other tempering fluids is supplied for blowing against the glass objects being tempered. The blowing and sucking elements connected to the box 104 may be rotated by suitable connections from the motor 108, which is fixed on a support 107 on the box 104 and which actuates the shaft 109 carrying spaced pinions 110. As best shown in Fig. 15, the blowing and sucking elements used in this embodiment are substantially identical with those shown in Fig. 8, with circumferentially spaced fingers 30' arranged to blow air against the exterior of the glass objects when the shelf 96 and associated elements are in lowered position. Such air is supplied to fingers 30' from compressed air pipe 106, lower portion of box 104 and hollow shafts 2', which are formed with spaced apertures 114. (Fig. 17.) Suction of air from adjacent the glass objects is effected through circumferentially spaced pipes 34' alternating with fingers 30', vertical pipe 27', the upper portion of box 104 and suction pipe 105, spaced apertures 115 (Fig. 16) in shaft 2' above the terminal flange of pipe 27' enabling the passage of the drawn air into the upper portion of box 104. Rotation of the blowing and sucking elements is secured from motor 108 simultaneously with the up-and-down motion imparted to box 104 and associated elements from motor 99.

In the illustrated embodiment, the glass objects being tempered are advanced in suitable progressive steps so that four of such objects will quickly emerge from the heating chamber 41, and then stay in substantially stationary positions during the tempering treatment. While so stationary, the shelf 96 and associated elements are lowered to bring the blowing and sucking nozzles of the tempering mechanism into positions to effectively temper the heated glass objects. The shelf 96 is then elevated and the glass objects advanced through another step, which, of course, brings another set of glass objects into position to be tempered.

What I claim is:

1. In the method of tempering glass articles by heating the same and thereafter suddenly cooling, the steps of slowly passing a hollow glass article through a substantially closed heat insulated zone, concurrently separately applying heat to the article from within the article, slowly rotating the article during heating, passing the article from the heat insulated zone, suddenly subjecting the article to a cooling blast directed against the interior and exterior surfaces thereof, and continuously relatively rotating and reciprocating the blast and the article during the entire cooling operation.

2. A method as claimed in claim 1 including subjecting the exterior of the hollow article to a slower cooling than the interior thereof whereby to displace the core of the article toward the interior thereof.

3. In the method of tempering glass articles by heating the same and thereafter suddenly cooling, the steps of slowly passing a hollow glass article through a substantially closed heat insulated zone, concurrently separately applying heat to the article from within the article, slowly rotating the article during heating, passing the article from the heat insulated zone, suddenly subjecting the article to a cooling blast directed against the interior and exterior surfaces thereof, continuously relatively rotating and reciprocating the blast and the article during the entire cooling operation, and continuously impressing indicia in the bottom of the hollow article through both the heating and cooling operations.

4. A method as claimed in claim 1 including applying heat to the edge of the hollow article as well as to the interior thereof during passage through the heating zone, whereby to insure tempering of such edge.

5. In the method of tempering glass articles by heating the same and thereafter suddenly cooling, the steps of slowly passing a hollow glass article through a substantially closed heat insulated zone, concurrently separately applying heat to the article from within the article, slowly rotating the article during heating, passing the article from the heat insulated zone, suddenly subjecting the article to a cooling blast directed against the interior and exterior surfaces thereof, said cooling blast being directed proportionally to the thickness of the article, and continuously relatively rotating and reciprocating the blast and the article during the entire cooling operation.

6. In the method of tempering glass articles by heating the same and thereafter suddenly cooling, the steps of slowly passing a thin hollow glass article through a substantially closed heat insulated zone, concurrently separately applying heat to the article from within the article, slowly rotating the article during heating, passing the article from the heat insulated zone, suddenly subjecting the article to a cooling blast at a pressure of from seven to eight atmospheres directed against the interior and exterior surfaces thereof for a period of five to ten seconds, and continuously relatively rotating and reciprocating the blast and the article during the entire cooling operation.

ALBERTO QUENTIN.